UNITED STATES PATENT OFFICE.

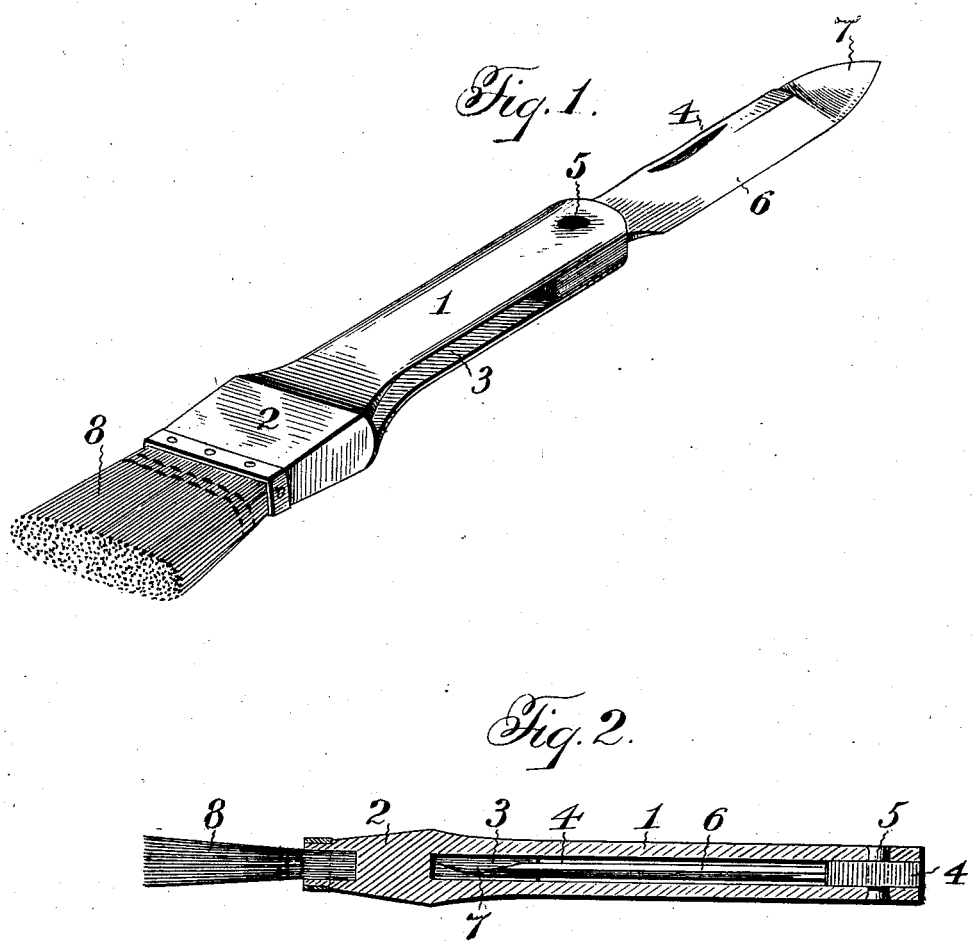

ANNIE M. FURROW, OF WASHINGTON, DISTRICT OF COLUMBIA.

GREEN-CORN HUSKER AND SILKER.

SPECIFICATION forming part of Letters Patent No. 725,951, dated April 21, 1903.

Application filed September 16, 1902. Serial No. 123,625. (No model.)

*To all whom it may concern:*

Be it known that I, ANNIE M. FURROW, a citizen of the United States, residing at Washington, in the District of Columbia, have invented a new and useful Green-Corn Husker and Silker; and I do hereby declare the following to be a full, clear, and exact description of the invention, such as will enable others skilled in the art to which it appertains to make and use the same.

The invention relates to a green-corn husker and silker; and it has for its object to provide a simple, inexpensive, and efficient device adapted to be readily handled and capable of enabling the husk of an ear of green corn to be readily opened and the end of the cob and the husk to be readily severed from the ear and the silk removed from the latter.

A further object of the invention is to provide a device of this character which may be compactly arranged when not in use and in which the blade may be folded within the handle.

The invention consists in the novel construction and arrangement of parts hereinafter described, and particularly pointed out in the claim hereto appended.

In the drawings forming part of this specification, and in which like numerals of reference designate corresponding parts, Figure 1 is a perspective view of a corn husker and silker constructed in accordance with this invention and arranged for use. Fig. 2 is a longitudinal sectional view of the same, the device being folded or closed.

Referring to the drawings, 1 designates a handle provided at one end with an enlarged outwardly-tapered portion 2 and having a longitudinal opening or slot 3 extending inward from the other end to within a short distance of the enlarged portion 2 and adapted to receive a blade 4, secured to the handle by a suitable pivot 5 passing through suitable perforations of the sides. The blade, which may be loose, is provided with a cutting edge 6, and it has a tapered outer end 7 of concave or spoon-shaped configuration to enable it to be readily introduced into the husk of an ear of corn for opening the same to permit the husk to be readily stripped from the ear. The tapered end 7, which is provided at one side with a concave face, has opposite cutting edges and is adapted to readily enter the husk. The longitudinal cutting edge 6 of the blade is adapted to be used for cutting off the end of the cob to sever the husk from the ear. The enlarged tapered end 2 is provided with a flat brush 8, which may be constructed of any suitable material and which will enable the silk of an ear of corn to be readily removed after the husk has been severed therefrom. The brush will enable the silk to be quickly brushed from the ear without bruising or otherwise injuring the corn.

It will be seen that the device is exceedingly simple and inexpensive in construction, that it possesses great strength and durability, and that it is adapted to enable corn to be rapidly shucked and quickly cleaned. It will also be seen that the corn husker and silker when not in use is adapted to be closed to arrange it compactly and to protect the blade and also to permit it to be conveniently carried without injury to the operator.

I desire it to be understood that various changes in the form, proportion, and minor details of construction within the scope of the appended claim may be made without departing from the spirit of the invention or sacrificing any of the advantages thereof.

What I claim is—

A green-corn husker and silker, comprising a handle provided at one end with a brush, and having a longitudinal opening extending inward from the other end, and a blade, pivoted in the said opening and having a longitudinal cutting edge and provided with a tapering concave point having opposite cutting edges, substantially as described.

In testimony whereof I have hereto affixed my signature in the presence of two witnesses.

ANNIE M. FURROW.

Witnesses:
 H. CLAY CARTER,
 DEAN SWIFT.